(12) United States Patent
Elkana

(10) Patent No.: US 10,766,209 B2
(45) Date of Patent: *Sep. 8, 2020

(54) HYBRID POLYMER PIPE AND TILE HYBRID POLYMER

(71) Applicant: Ron Elkana, Houston, TX (US)

(72) Inventor: Ron Elkana, Houston, TX (US)

(*) Notice: Subject to any disclaimer, the term of this patent is extended or adjusted under 35 U.S.C. 154(b) by 17 days.

This patent is subject to a terminal disclaimer.

(21) Appl. No.: 16/208,315

(22) Filed: Dec. 3, 2018

(65) Prior Publication Data

US 2019/0105856 A1    Apr. 11, 2019

Related U.S. Application Data

(63) Continuation-in-part of application No. 15/794,958, filed on Oct. 26, 2017, now Pat. No. 10,150,264.

(Continued)

(51) Int. Cl.
| | |
|---|---|
| *B29C 65/70* | (2006.01) |
| *B29C 70/34* | (2006.01) |
| *F16L 9/133* | (2006.01) |
| *B29C 48/00* | (2019.01) |
| *B29C 48/151* | (2019.01) |
| *B29C 48/88* | (2019.01) |
| *B29C 70/32* | (2006.01) |
| *B29K 25/00* | (2006.01) |
| *B29K 105/08* | (2006.01) |
| *B29K 27/06* | (2006.01) |

(Continued)

(52) U.S. Cl.
CPC ........ *B29C 70/347* (2013.01); *B29C 48/0015* (2019.02); *B29C 48/151* (2019.02); *B29C 48/9115* (2019.02); *B29C 70/326* (2013.01); *F16L 9/133* (2013.01); *B29K 2023/0683* (2013.01); *B29K 2023/14* (2013.01); *B29K 2025/06* (2013.01); *B29K 2027/06* (2013.01); *B29K 2105/0845* (2013.01); *B29L 2023/22* (2013.01); *F16L 9/12* (2013.01)

(58) Field of Classification Search
CPC ......... B29C 53/62; B29C 53/64; B29C 53/66; B29C 53/581; B29C 47/0052; B29C 70/224; B65D 90/022; B65D 90/029
USPC .................. 156/167, 171, 173, 190, 195
See application file for complete search history.

(56) References Cited

U.S. PATENT DOCUMENTS 3,625,389 A * 12/1971 Bartlow ............... B65D 90/029
  220/373
4,319,944 A * 3/1982 Pope .................... B29C 53/566
  156/195

(Continued)

*Primary Examiner* — Scott W Dodds
(74) *Attorney, Agent, or Firm* — Nolte Intellectual Property Law Group

(57) ABSTRACT

The method for forming from a round shaped cylinder to a square shaped cylinder or flat sheet which can be inserted in a square or rectangular shape metal pipe includes initiating turning of a heated mandrel, extruding heated polymer, wrapping while compressing a first layer of heated polymer or mesh, disposing a mesh or polymer layer over the cylinder encapsulating the cylinder on the turning mandrel while simultaneously laying a second layer of heated polymer over the turning mandrel and compressing the layer of heated polymer into the mesh layer and the mesh layer into the first layer of heated polymer simultaneously, and repeating the layering of the heated polymer and mesh layer until a desired wall thickness is reached.

12 Claims, 6 Drawing Sheets

Related U.S. Application Data

(60) Provisional application No. 62/414,386, filed on Oct. 28, 2016.

(51) Int. Cl.
    *B29K 23/00*     (2006.01)
    *B29L 23/00*     (2006.01)
    *F16L 9/12*     (2006.01)

(56) References Cited

U.S. PATENT DOCUMENTS

| | | | | |
|---|---|---|---|---|
| 6,102,241 A | * | 8/2000 | Palazzo | B29C 53/824 |
| | | | | 220/586 |
| 2005/0260373 A1 | * | 11/2005 | DeLay | B29C 53/602 |
| | | | | 428/36.4 |

* cited by examiner

FIG. 5A

100 — INITIATING TURNING OF A HEATED MANDREL HEATED TO A TEMPERATURE FROM 25 PERCENT TO 40 PERCENT LESS IN SURFACE TEMPERATURE THAN THE TEMPERATURE OF HEATED POLYMER, THE HEATED MANDREL BEING ROTATED A RATE OF SPEED FROM 1 TO 6 REVOLUTIONS PER MINUTE

110 — EXTRUDING THE HEATED POLYMER FROM AN EXTRUDER AT A VARIABLE A TEMPERATURE FROM 400 – 460 FAHRENHEIT WITHOUT DEFORMING OR BECOMING SOLUBLE

120 — WRAPPING WHILE COMPRESSING A FIRST LAYER OF HEATED POLYMER OVER THE TURNING MANDREL WHEREIN THE FIRST LAYER OF HEATED POLYMER IS AT LEAST ONE OF: DISPOSED AS OVERLAPPING WRAPPING ON THE TURNING HEATED MANDREL FROM ONE EDGE OF THE TURNING HEATED MANDREL TO THE OPPOSITE EDGE OF THE TURNING HEATED MANDREL UNTIL FROM 70 PERCENT TO 80 PERCENT OF THE SURFACE OF THE TURNING HEATED MANDREL IS COVERED IN THE LAYERS OF HEATED POLYMER FORMING A CYLINDER

130 — DISPOSING A MESH LAYER OVER THE CYLINDER ENCAPSULATING THE CYLINDER ON THE TURNING HEATED MANDREL WHILE SIMULTANEOUSLY LAYING A SECOND LAYER OF HEATED POLYMER OVER THE TURNING HEATED MANDREL WITH A WIDTH FROM 4 INCHES TO 1¼ FEET AND COMPRESSING THE LAYER OF HEATED POLYMER INTO THE MESH LAYER AND THE MESH LAYER INTO THE FIRST LAYER OF HEATED POLYMER SIMULTANEOUSLY

140 — REPEATING THE LAYERING OF THE HEATED POLYMER AND THE MESH LAYER UNTIL A DESIRED WALL THICKNESS IS REACHED; WHEREIN A QUANTITY OF LAYERS OF HEATED POLYMER ARE EQUAL TO OR GREATER THAN THE MESH LAYER; AND WHEREIN A FINAL LAYER OF THE CYLINDER CAN BE AT LEAST ONE OF THE MESH LAYER AND THE HEATED POLYMER LAYER CREATING THE HYBRID POLYMER CYLINDER

150 — PERFORMING AT LEAST ONE OF THE FOLLOWING: WHILE HOT, REMOVING THE HYBRID POLYMER CYLINDER FROM THE MANDREL AND FORMING A WARM HYBRID POLYMER SQUARE TANK AND WHILE COOL, REMOVING THE HYBRID POLYMER CYLINDER FROM THE MANDREL FORMING A HYBRID POLYMER ROUND PIPE ADDING A MANWAY, FLANGE FITTINGS, A TOP PLATE AND A BOTTOM PAN TO COMPLETE THE SQUARE, OVAL OR ROUND PIPE

FIG. 5C

CONVERTING THE SHIPPING CONTAINER AND FRAC PIPES TO A PLASTIC CONTAINER THAT IS SUPPORTED BY THE METAL STRUCTURE OF THE CONTAINER AND FRAC PIPE — 220

HYBRID POLYMER PIPE AND TILE HYBRID POLYMER

CROSS-REFERENCE TO RELATED APPLICATION

The present application claims priority to and the benefit of U.S. Provisional Patent Application Ser. No. 62/414,386 filed on Oct. 28, 2016, entitled "HYBRID POLYMER CONTAINER" and co-pending U.S. Non-Provisional patent application Ser. No. 15/794,958 titled Hybrid Polymer Container claiming priority to the provisional application. This reference is hereby incorporated in its entirety.

FIELD

The present embodiment generally relates to accelerated method for making a reduced plastic content hybrid polymer pipe and tile for industrial processes and storage of liquid and solids, more particularly to a pipe with extruded components or flat sheet joined to an extruded cylinder.

The extruded plastic layers can be reinforced with the mesh in between the layers.

BACKGROUND

A need exists for an extrusion pipe and tile which has tolerance for apertures.

A further need exists for an extrusion pipe and tile that does not crack when such apertures are made or inserted into such pipes.

The present embodiments meet these needs.

The present invention relates generally to pipe and tiles for industrial processes and storage of liquids and solids, more particularly to a pipe with extruded components or flat sheet joined to an extruded cylinder.

After the oil strike in Titusville, Pa., the petrochemical and water industries have sought tanks to store various fluids, slurries, gases, pellets, and solids. Such tanks have used reinforced concrete and steel observed at refineries, chemical plants, water treatment plants, factories, sewer plants, shipyards, terminals, and the like. Where industry has to store a component or ingredients, tanks appear and stand duty.

Industry has made tanks by winding layers of material for a few decades in many countries. Polymer tanks come in many sizes for various applications. The tanks begin as an extruder emits a strip of heated polymer onto a rotating mold. The extruder emits the strip under a roller gang that presses the polymer upon the mold. Following the first revolution of the mold, the extruder overlaps a new strip upon the adjacent previous strip as the extruder moves axially parallel to the mold. The extruder, roller gang, and mold cooperate to fuse the layers of polymer into a cylinder such as a tank.

Select tanks have had reinforcement with polymers like polyethylene, polypropylene, polyester, vinyl ester, epoxies of glass, carbon fiber, Kevlar®, and the like. The reinforcement enters the tank assembly as another component blended into molten polymer. However, select components alter the performance of the polymer and discourage mixing of them.

During extrusion of a pipe, the strip has a width from a few inches to a foot and a thickness of $\frac{1}{16}$ to $\frac{1}{2}$ inch. The strip wraps upon a rotating drum whose rotation slow ejects a nascent cylinder following compression by the roller gang. The roller gang compresses the polymer strip so that adjacent wrapped strips fuse totally and avoid any accumulation of air between adjacent strips. The strip has approximately $\frac{1}{2}$ inch to half of strip width of overlap between adjacent wraps as the extruder moves horizontally and ejects a nascent cylinder. This wrapping of strip to form a cylinder appears similar to the medical practice of wrapping a bandage, or cast material, upon a human arm. Repeating the wrapping of the strip back and forth horizontally with the extruder then increases the wall thickness of a resulting polymer cylinder for a tank, a pipe, or when slit, a flat sheet.

DESCRIPTION OF THE PRIOR ART

The publication to Hsi-Wu, No. 2005/0001100 shows reinforced foam upon a fuel tank. The fuel tank has a skin with an exterior surface that receives a foam layer. The foam layer has reinforcement placed in it. Hsi-Wu claims a composite or reinforced insulation layer affixed to a skin layer.

The patent to Stearns, U.S. Pat. No. 2,376,831 describes a high pressure vessel. The vessel has a thin walled, gas impervious, inner shell wrapped in a woven wire sheath, and caps encasing the reinforced shell. This patent shows wire woven into an apparent mesh pattern and placed between two steel walls. This patent discloses a method of weaving a mesh but does not show the mesh as an integral part of a tank wall.

The patent to Broerman, U.S. Pat. No. 3,426,940 illustrates pressure vessels formed within molds. FIGS. 2, 3 show insertion of a sock, column 3 line 45, also shown as c. 3 1. 45, into a chamber and then inflation of polymer against that sock. The sock then embeds and fuses between two parisons 6, 12 producing a reinforced wall. The patent has an example VI that describes a rotating pipe mold at a speed to throw cloth outwardly.

The patent to Goldsworthy, U.S. Pat. No. 3,692,601 provides a method for making a storage tank of fiberglass. This method first forms the end domes for the tank then places the end domes into a tank mold. The fiberglass resin and filaments are placed upon the interior of a cylindrical mold. The mold has three hinged sections and rotates.

The patent to Terlesky, U.S. Pat. No. 4,041,722 shows another cryogenic storage tank, for liquefied natural gas among other fluids. This tank has an inner metal tank within a reinforced concrete outer wall for protection from large impacts, c. 1 1. 7, 32. This patent refers to reinforced concrete in passing for the outer wall and has little if any discussion about reinforcing steel mesh whether as a grid, Q mat, fabric, rebar, or bar steel.

The patent to Palazzo, U.S. Pat. No. 6,022,435 has a method of making an underground storage tank, generally for petroleum fuels and products. The method produces a double walled tank with an inner tank 10, an outer sheath 56, and spacing means 62 between the inner tank and outer sheath shown in FIG. 1. The spacing means does permit flow of liquids between the inner tank and outer sheath, c. 2 1. 53-55, c. 7 1. 57-62. The spacing means includes a thermoplastic mesh 64, c. 7 1. 45-46. Alternatively, the spacing means includes protrusions 78, c. 9 1. 55-60. This patent does not describe bonding the mesh to both the inner tank and outer sheath.

The second Palazzo patent, U.S. Pat. No. 6,026,977 describes an underground storage tank for petroleum and made from a similar method as in the '435 patent. The spacing means does permit flow of liquids between the inner tank and outer sheath and mentions a thermoplastic mesh.

This patent though puts more emphasis upon a resin layer and an adhesive located near a tank aperture.

The third Palazzo patent, U.S. Pat. No. 6,102,241 provides an underground petroleum storage tank. This patent describes making of a tank upon a mold 10 from helically wound strips 32 as in FIG. 1. The description continues with making a second tank outwardly of the first tank to make a double walled tank. The second tank has a release layer upon it 54 that spaces the second tank from the first tank similarly to the preceding patent. This patent mentions mesh in one place, as a release material. The release material once again spaces the inner tank, or first tank, from the outer sheath, or second tank, and allows passage of liquids between them.

The fourth Palazzo patent, U.S. Pat. No. 6,119,887 once more has an underground petroleum storage tank and a method to make it. This patent describes making of a tank upon a mold 10 from helically wound strips 32 as in FIG. 1. This patent mentions mesh 34 in one place, as a release material. The release material once again spaces the inner tank from the outer sheath so liquids may pass between them. Your invention merges the mesh into the polymer layers and leaves no spacing or gap.

The fifth Palazzo patent, U.S. Pat. No. 6,138,861, shows a double walled underground petroleum storage tank and a method to make it. This patent describes adding helically wound strips 56 upon a steel tank 10 as in FIG. 1. This description begins with the steel tank and then the resins as in the previous four patents. This patent mentions mesh 64 as a release material that spaces the inner tank from the outer sheath so liquids pass between them.

Turning to the Keehan patent, U.S. Pat. No. 6,167,827 illustrates a maritime chemical tanker vessel. The vessel has many tanks within its hull and they have four layer construction using resins. A mesh has an inorganic top coat and placement in the fourth outer layer for fire protection of the tank. The patent describes the mesh as steel for heat dissipation.

Keehan has a second patent, U.S. Pat. No. 6,267,069, that provides a six layer tank for a maritime chemical tanker vessel. This patent shows a tank of six layers. The fifth and sixth layers have locations relative to the second and third layers respectively. Once more, the mesh has an inorganic top coat and placement in the fourth outer layer for fire protection of the tank. The mesh of steel dissipates heat dissipation.

And, the publication to Roy, No. 2002/0088805 describes a double walled storage tank. Roy has the tank as an inner tank wrapped in an impervious film and then covered with reinforced resinous material. The description shares much with the Palazzo patents above and their crinkled spacing means. Roy describes the reinforced resinous material as fiberglass and then mentions mesh, para. 0023, as a spacer means for the endwalls of the tank. Roy omits discussion of the mesh embedding into the tank or any polymer.

The present invention seeks to overcome the disadvantages of the prior art and provide additional advantages not heretofore shown. While the present invention serves many purposes, it accommodates the restrictions of each.

The present invention has a pipe of extruded components joined to an extruded cylinder. This combination of components maximizes the strengths of each and minimizes the weaknesses of extruded components.

BRIEF DESCRIPTION OF THE DRAWINGS

The detailed description will be better understood in conjunction with the accompanying drawings as follows:

FIG. 5A-5C depicts the method according to one or more embodiments.

Figure 1:
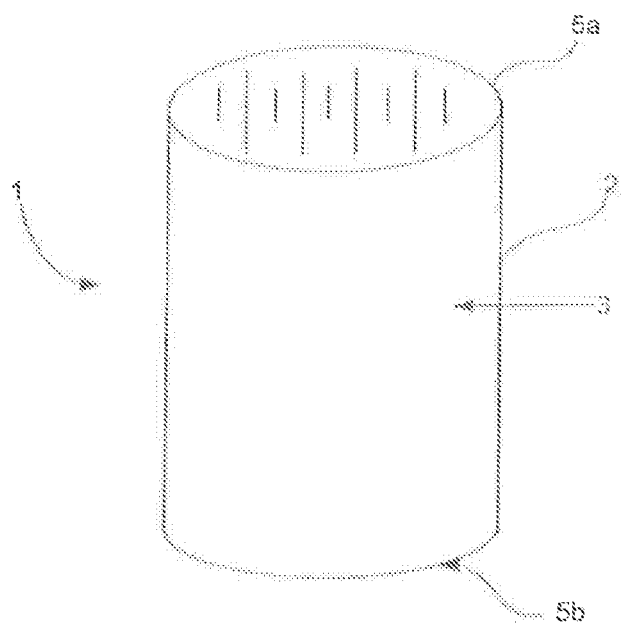
FIG. 1 depicts an exploded view of the pipe according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present invention relates to the accelerated method for making a reduced plastic content hybrid polymer pipe.

The method for making a reduced plastic content hybrid polymer pipe can include initiating turning of a heated mandrel heated to a temperature from 25 percent to 40 percent less in surface temperature than the temperature of heated polymer, the heated mandrel being rotated a rate of speed between 1 and 6 revolutions per minute.

The method can include extruding the heated polymer from an extruder at a variable a temperature from 400-460 Fahrenheit without deforming or becoming soluble.

The method can include wrapping while compressing a first layer of heated polymer over the turning mandrel wherein the first layer of heated polymer is at least one of: disposed as overlapping wrapping on the turning heated mandrel from one edge of the turning heated mandrel to the opposite edge of the turning heated mandrel until from 70 percent to 80 percent of the surface of the turning heated mandrel is covered in the layers of heated polymer forming a cylinder.

The method can include disposing a mesh layer over the cylinder encapsulating the cylinder on the turning heated mandrel while simultaneously laying a second layer of heated polymer over the turning heated mandrel with a width from 4 inches to 1½ feet and compressing the layer of heated polymer into the mesh layer and the mesh layer into the first layer of heated polymer simultaneously.

The method can include repeating the layering of the heated polymer and the mesh layer until a desired wall thickness is reached; wherein a quantity of layers of heated polymer are equal to or greater than the mesh layer; and wherein a final layer of the cylinder can be at least one of the mesh layer and the heated polymer layer creating the hybrid polymer cylinder.

The method can include performing at least one of the following: while hot, removing the cylinder from the mandrel and forming a warm hybrid polymer square pipe; and while cool, removing the hybrid polymer cylinder from the mandrel forming a hybrid polymer round pipe, adding a manway, flange fittings, a top plate and a bottom pan to complete the square, oval or round pipe.

The method of transforming from a round shaped cylinder to a square shaped cylinder by putting the round shaped cylinder in a rectangular jig while hot and compressing it with the top of the jig to achieve the desired height of the square/rectangular cylinder.

The method can include cooling the warm hybrid polymer square pipe and welding a top plate and a bottom pan of a polymer similar to the material used to make the pipe to an outside surface of the pipe enclosing the pipe and supporting the top plate and the bottom pan with at least one rib providing pressure control to the interior of the square pipe.

In an embodiment, the invention can involve a process where a reinforcing layer is placed between at least two layers of polymer. The reinforcing layer includes continuous wire filament in an orthogonal or an irregular arrangement and a grid like mesh.

This embodiment reinforces polymers, such as high density polyethylene, low density polyethylene, and polypropylene, in a spiral wound extrusion process. This embodiment may see use in other processes of manufacturing such as injection molding, compression molding, vacuum molding, and the like. The reinforcing or mesh layer extends between layers of heated polymer as the extruder moves along, continually wrapping the polymer and mesh upon the mold.

A roller gang presses a later layer of polymer upon the mesh and fuses it to a prior layer. The mesh generally extends for the length of the desired finished product. The mesh has a grid like form with filaments of a flat cross section, bonds and merges with the polymer, and provides additional strength against compressive loads.

In this embodiment, the mesh materials may have a coating of polyethylene, polypropylene, polyvinyl chloride, ultra high molecular weight polyethylene, polyvinylidene fluoride, Kynar®, or have no coating. In an alternate embodiment, the mesh is replaced with a glass rope, metallic wire, Kevlar®, or other continuous material.

In this embodiment, when the drum rotates with the spiral wound strip applied to it and the extruder moves slowly to the length of the desired cylinder, the extruder emits a strip of polymer, often seven inch wide by ½ inch thick. During the wrapping of a spiral strip, reinforcement material enters the strip automatically from a spool of glass rope, metallic wire, Kevlar®, or other continuous material.

The reinforcing material embeds between a first layer of polymer or mesh and a second adjacent layer of polymer or mesh. The width of the reinforcing material may measure larger or smaller than the strip of applied polymer. The reinforcing material may have a mesh structure and bonds one strip to an adjacent strip. The reinforcing material undergoes a fusion, chemical bond, or physical bond with the polymer under action of the roller gang.

The roller gang presses the molten polymer through the openings of the mesh of reinforcing material. This pressing of polymer into the mesh creates a full fusion between a first layer of polymer, reinforcing material, and a second layer of polymer. The innermost layer of a strip has solely polymer while layers outwardly merge reinforcement between every other layer.

The placement of reinforcement continues between a second and third layer of polymer strip, a third and fourth layer of polymer strip, and additional layers and the embodiment continues this process until the desired thickness appears for the finished product of pipe.

The embodiments have mesh reinforcement that increases the strength of the polymer cylinder, pipe, or flat sheet in compression resistance, shear resistance, elongation, and creep prevention. The reinforcement allows for reducing the thickness of the polymer in a finished product while maintaining the desired structural properties. The reinforcement can influence the expansion and contraction coefficient of the polymer. For example, adding a metal mesh will decrease the expansion and contraction of the polymer due to raising temperature environment.

The embodiments can allow for creation of cylinders for a pipe and flat sheets made by cutting a warm plastic cylinder along its length, measure upon the drum. The cut former cylinder, warm and viscous, then is pulled off the drum and set upon a flat surface for cooling. A flat sheet then has dimensions of the length of its parent cylinder, a width of pi times the diameter of the parent cylinder, and the thickness of the parent cylinder's wall.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings.

Before explaining the current embodiment of the invention in detail, it is to be understood that the invention is not limited in its application to the details of construction and to the arrangements of the components set forth in the following description or illustrated in the drawings.

The embodiments are capable of other embodiments and of being practiced and carried out in various ways. Also, the phraseology and terminology employed herein are for the purpose of description and should not be regarded as limiting.

This invention allows industries such as manufacturers, chemical, oil and natural gas, mining, agriculture, water treatment, pharmaceuticals, steel industry, petroleum, municipalities, energy (including alternative energy), food and other industries to store any substance in the plastic rectangular or square pipe that is suitable to polyethylene or polypropylene. In the case of polypropylene, it will allow storing chemicals with elevated temperatures up to 200° F. (chemical dependent).

This type of pipe can be utilized efficiently in a case of an emergency of chemical spill.

The mesh layers in the pipe provide a benefit to life because they have the ability to ground carbon or steel mesh therefore dissipating static electricity and prevent explosion therefore causing death.

This invention has the ability to dissipate static electricity to be able to ground a metal pipe.

Cylindrical pipes typically tend to take a lot of space and specifically during delivery they can become an oversized dimensional load.

The following terms are used herein:

The term "heated mandrel" can refer to a metal cylindrical mandrel that is built to sustain shrinkage of plastic. The mandrel is collapsible. The mandrel is wrapped with layers of heated polymer with a controlled width of 1 inches to 12 inches. Heated at from 130 to 170 degrees Celsius. The mandrel is a mold and is used repeatedly. The plastic (band) sheeting is taken from the mandrel by collapsing or reducing the diameter of the mandrel.

The term "heated polymer" can refer to feeding the extruder with room temperature plastics beads (raw material), the raw material can be either re-grind, virgin or a combination of virgin and re-grind material. The extruder heats the plastic and the output from a die is a plastic sheeting or plastic band. This plastic band is wrapped on the mandrel in a spherical manner.

The term "mesh layer" can refer to feeding a roll of metal mesh continuously through a roller to match the plastic sheeting or plastic band. The mesh layer and is wrapped around the mandrel with the plastic sheeting or band. The mesh layer is completely imbedded in the plastic sheeting or band.

The term "wall thickness" can refer to desired thickness of the layer of polymer after it has been wrapped around the mandrel.

The term "hybrid polymer pipe" can refer to plastic layers after they have been fused to make the square, oval or round pipe.

The term "roller gang" can refer to an apparatus to apply pressure to fuse one layer of sheeting or band to another.

Turning now to the figures, FIG. 1, the hybrid polymer pipe of the present invention appears as at 1.

FIG. 1 depicts an exploded view of the pipe according to one or more embodiments.

The pipe 1 has its cylinder 2 of extruded polymer with two open ends 5a and 5b. The hollow cylinder 2 has its wall 3 with a wall thickness. The wall thickness may vary but has a minimum of ¼ inch.

The cylinder 2 has preferably a round or square form with a diameter. The diameter also varies but has a maximum set by road width clearances for truck transport. The cylinder also has its height that varies but has a maximum set by trailer lengths for road transport, typically forty feet.

The cylinder though has an alternate embodiment made of sections so that a pipe 1 may have a height greater than forty feet.

In this alternate embodiment, the sections join using polymer welding techniques as the installation site. As before, the cylinder and sections of cylinder have an extruded construction.

Figure 2:
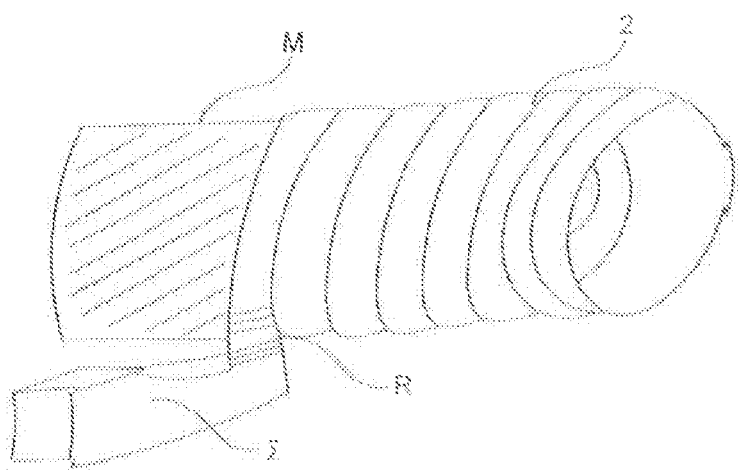
FIG. 2 depicts a perspective view of an alternate embodiment of polymer layers according to one or more embodiments.

FIG. 2 depicts reinforcing the construction of the cylinder 2 according to one or more embodiments.

The cylinder begins as a strip of molten polymer placed upon a mold or mandrel M having a drum shape. The drum slowly rotates and a carriage (not shown) beneath the cylinder slowly pulls it off the drum and the remainder of the mold or mandrel M. As described above, the strip of polymer wraps upon itself to make the wall 3 of the cylinder 2 at a desired thickness.

The wrapping of the polymer strip occurs through a roller gang R that nearly abuts the mold or mandrel M. The roller gang has its position at the end of an extruder E that emits the strip of polymer from precursor components supplied into the extruder.

In embodiments, the roller gang can apply from 90 psi to 140 psi onto the mesh layer or onto the polymer layer.

In operation, the drum rotates slowly as the extruder emits the polymer strip so the roller gang can overlap the polymer strip with each rotation of the drum.

The rotation rate of the drum, wraps to reach a desired wall thickness, and pull rate of the carriage have a coordinated action that produces a cylinder 2 of desired length, wall thickness, and diameter.

In embodiments, the polymer comprises polypropylene, polyethylene, including homopolymers and copolymers thereof, polyvinyl chloride, carbon polyvinyl chloride; polystyrene, and ultra high molecular weight polyethylene.

Figure 3:
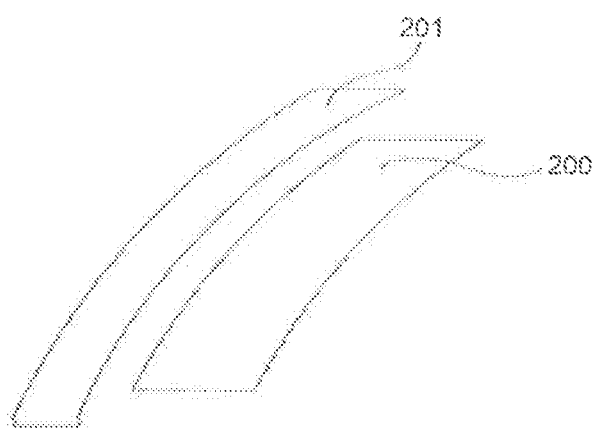
FIG. 3 depicts a detailed view of two layers according to one or more embodiments.

FIG. 3 shows the overlap of two adjacent strips of polymer, outwardly from the roller gang R.

The strips include a layer A 200 shown towards the right of the figure and a layer B 201 shown towards the left of the figure. The layer A 200 was placed upon the cylinder 2 ahead and before the layer B 201 by the roller gang. The roller gang then compresses layer B 201 upon layer A 200. The compression continues as the drum turns and the cylinder moves laterally to the right, as previously shown in FIG. 10.

Figure 4:
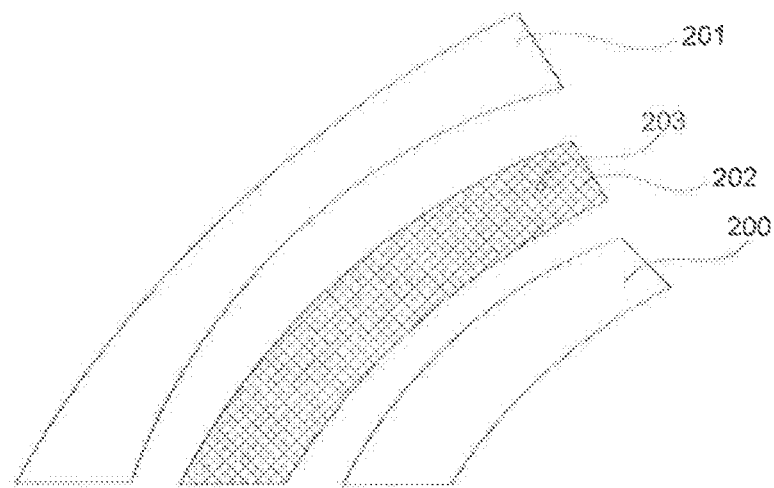
FIG. 4-4A depicts a sectional view of two layers reinforced according to one or more embodiments.
Figure 4A:
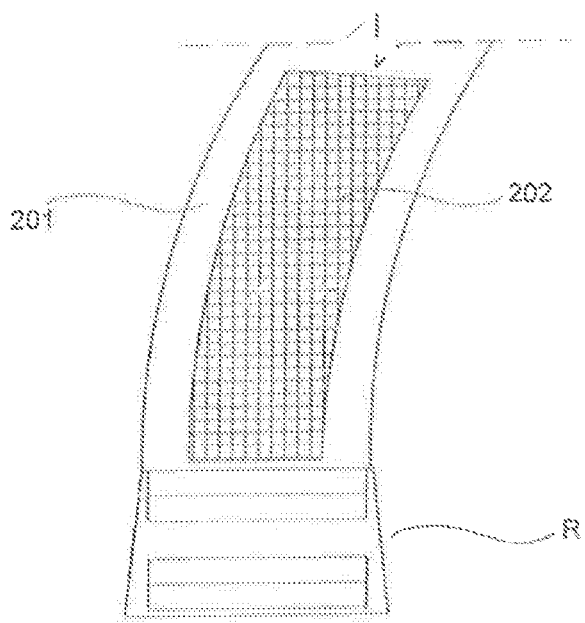

FIGS. 4-4A show an additional embodiment. The roller gang R previously applied layer A 200 upon the drum to commence making the cylinder. This embodiment then starts application of a mesh layer 202 upon layer A 200 and then beneath layer B 201.

The mesh layer has flexibility to follow the curvature of the layers 200, 201 of the polymer forming the cylinder. The mesh layer also has openings 203 of a minimum size to admit molten polymer into the mesh. The mesh also has a width similar to that of the polymer strips, here shown as layer A and layer B.

The roller gang R presses the layer B 201 upon the mesh layer 202 and into the layer A 200 of polymer in FIG. 12a. This figure shows layer B 201 as transparent to reveal the mesh layer molded into the wrap of layer A and layer B.

The mesh layer 202 emits from the roller gang R similar to the strip of molten polymer. The mesh layer 202 extends beneath layer B 201 and the roller gang then compresses both the layer B 201 and the mesh layer 202 into the preceding polymer layer A. The mesh layer than extends around and along the cylinder and through the wall thickness of the wall 3 of the cylinder 2.

The mesh layer may have various materials for its construction as described above. The mesh layer may also have various weaving patterns to optimize bonding with the polymer material and maximizing strength to weight ratio for the mesh, the polymer, and the cylinder. The mesh layer also extends at a rate from the roller gang to match the rotation rate of the drum, wraps to reach a desired wall thickness, and pull rate of the carriage have a coordinated action that produces a cylinder 2 of desired length, wall thickness, diameter, and strength.

In embodiments, the mesh layer can have a pore size from ¼ inch long to one inch long and from ¼ wide to one inch wide. For instance, the pore size can be ¼ inch×¼ inch, ½×½ inch, ⅜ inch×⅜ inch, or ¾ inch×¾ inch.

In embodiments, the mesh layer has a thickness from 0.4 mm to 2 mm and comprises at least one of: carbon steel, carbon steel coated with zinc, galvanized steel; Fiberglass™, carbon graphite fabric, nylon (Kevlar®), cotton fabric; and stainless steel.

Figure 5B:
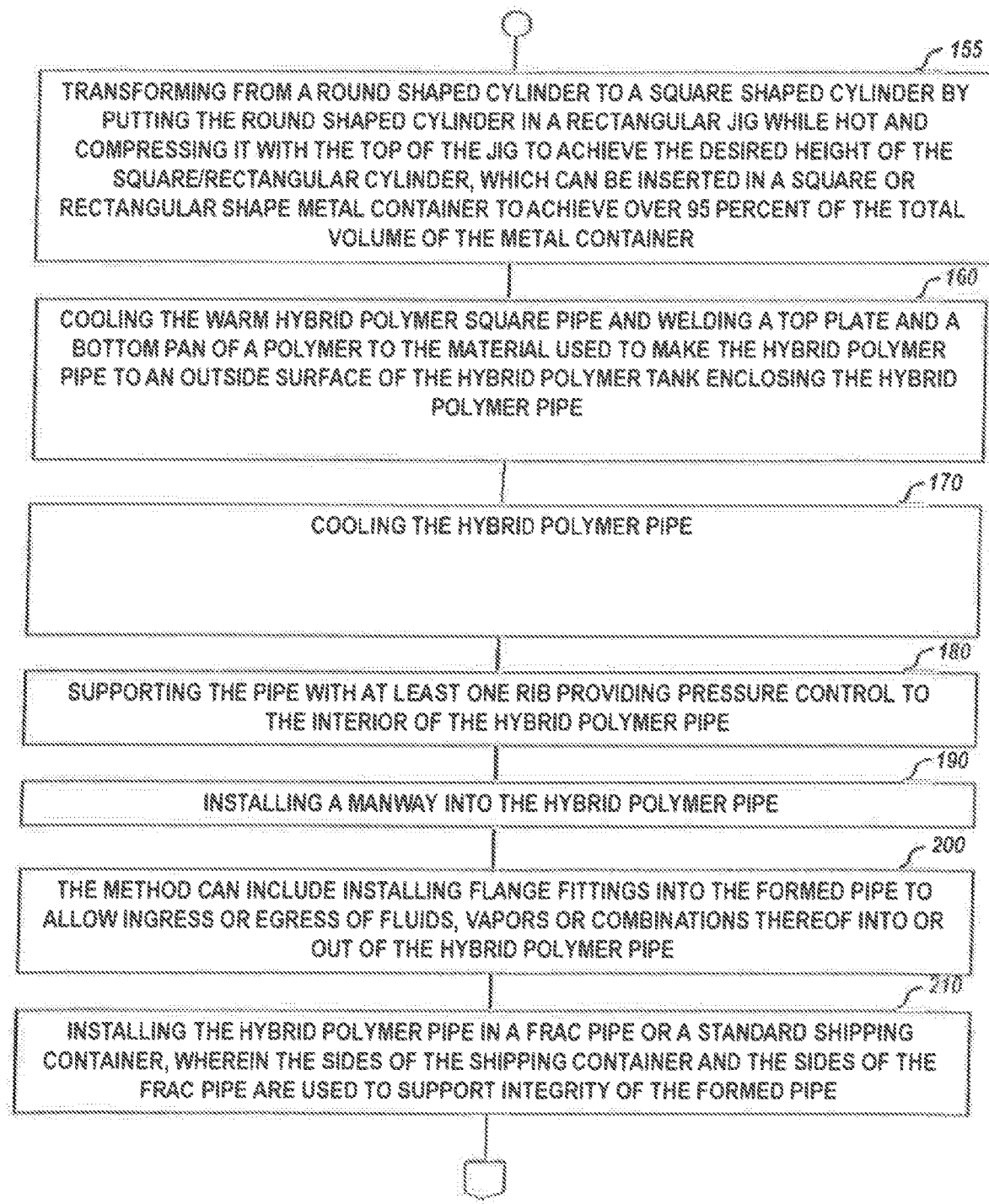

FIGS. 5A-5C depict the accelerated method for making a reduced plastic content hybrid polymer pipe, which can include, but is not limited to the steps described below. The method can be utilized by a person of ordinary skill in the industry, and is not limited to a particular order or sequence.

In an embodiment, the method can include initiating turning of a heated mandrel heated to a temperature from 25 percent to 40 percent less in surface temperature than the temperature of heated polymer, the heated mandrel being rotated a rate of speed between 1 and 6 revolutions per minute, as shown in box 100.

For instance, a 4 foot diameter mandrel can be rotating 6 revolutions per minute, which is fast or a 12 foot diameter mandrel can be rotating at 1 revolution per minute, which is slow.

The method can include extruding the heated polymer from an extruder at a variable a temperature from 400-460 Fahrenheit without deforming or becoming soluble, as shown in box 110.

The method can include wrapping while compressing a first layer of heated polymer over the turning mandrel wherein the first layer of heated polymer is at least one of: disposed as overlapping wrapping on the turning heated mandrel from one edge of the turning heated mandrel to the opposite edge of the turning heated mandrel until from 70 percent to 80 percent of the surface of the turning heated mandrel is covered in the layers of heated polymer forming a cylinder, as shown in box 120.

The method can include disposing a mesh layer over the cylinder encapsulating the cylinder on the turning heated mandrel while simultaneously laying a second layer of heated polymer over the turning heated mandrel with a width from 4 inches to 1½ feet and compressing the layer of heated polymer into the mesh layer and the mesh layer into the first layer of heated polymer simultaneously, as shown in box 130.

In embodiments, the layers can have a thickness from ¼ inch thickness to 1½ inch.

The method can include repeating the layering of the heated polymer and the mesh layer until a desired wall thickness is reached; wherein a quantity of layers of heated polymer are equal to or greater than the mesh layer; and wherein a final layer of the cylinder can be at least one of the mesh layer and the heated polymer layer creating the hybrid polymer cylinder, as shown in box 140.

The method can include performing at least one of the following: while hot, removing the hybrid polymer cylinder from the mandrel and forming a warm hybrid polymer square pipe and while cool, removing the hybrid polymer cylinder from the mandrel forming a hybrid polymer round pipe, adding a manway, flange fittings, a top plate and a bottom pan to complete the square, oval or round pipe, as shown in box 150.

The method can include transforming from a round shaped cylinder to a square shaped cylinder by putting the round shaped cylinder in a rectangular jig while hot and compressing it with the top of the jig to achieve the desired height of the square/rectangular cylinder, as shown in box 155.

The method can include cooling the warm hybrid polymer square pipe and welding a top plate and a bottom pan of a polymer to the material used to make up the hybrid polymer pipe and provide at least one rib providing pressure control to the interior of the square pipe, as shown in box 160.

The method can include cooling the hybrid polymer pipe and welding the top plate and the bottom pan of a polymer similar to the material used to make the hybrid polymer pipe to an outside surface, as shown in box 170.

The method can include supporting the top plate and the bottom pan with at least one rib providing pressure control to the interior of the hybrid polymer pipe, as shown in box 180.

The method can include installing a manway into the hybrid polymer pipe, as shown in box 190.

The method can include installing flange fittings into the formed pipe to allow ingress or egress of fluids, vapors or combinations thereof into or out of the hybrid polymer pipe, as shown in box 200.

In embodiments, the round shaped cylinder and oval shaped cylinder and square shaped cylinder are seamless.

From the aforementioned description, a hybrid polymer pipe has been described. The hybrid polymer pipe is uniquely capable of joining an extruded top plate and an extruded bottom pan to an extruded cylinder.

Further, the hybrid polymer pipe may also have a mesh layer pressed into alternating layers of heated polymer during construction of a cylinder and other related features compatible with the structure and purpose of the invention as shown and described.

The hybrid polymer pipe and its various components may be manufactured from many materials, including but not limited to, vinyl, polymers, such as nylon, polypropylene, polyvinyl chloride, high density polyethylene, ferrous and non-ferrous metal foils, their alloys, and composites.

Below are examples of how the apparatus and method can be used.

EXAMPLE 1

A reduced plastic content one piece integral wound pipe is made by initiating a turning of a heated mandrel that is heated to a temperature of 40 percent less in surface temperature than the temperature of the hot plastic sheeting. The heated mandrel is being rotated a rate of speed of two revolutions per minute on a 9 foot diameter mandrel.

Heated plastic sheeting is extruded from an extruder in a spiral manner on the heated mandrel at a variable temperature 400 degrees Fahrenheit without deforming or becoming soluble.

A first layer of heated polymer is wrapped while being compressed over the turning heated mandrel wherein the first band of hot plastic disposed as overlapping wrapping on the turning mandrel or until 80 percent of the surface of the turning mandrel is covered in the layers of heated polymer forming a compressed continuous one piece sheath.

A mesh layer is disposed over the compressed continuous sheath encapsulating the cylinder on the turning mandrel while simultaneously laying a second layer of heated polymer over the turning mandrel ¼ inch thickness with a width of 4 inches and compressing the layer of heated polymer into the mesh layer and the mesh layer into the first layer of heated polymer simultaneously.

The layering of the heated polymer and mesh layer is repeating until a wall thickness is reached, wherein a quantity of layers of heated polymer are equal to or greater than the layers of mesh layer.

The final layer of the one piece integral wound pipe can be a heated polymer layer creating a one piece integral continuous wall pipe.

While hot, the one piece integral continuous wall pipe is removed from the mandrel by collapsing the metal (decreasing the diameter of the metal mandrel), which allows the heated mandrel to be removed out of the heated plastic cylinder.

A warm one piece integral continuous wall square pipe is formed by putting the plastic cylinder into a rectangular jig that is a bit smaller dimension than the cross section of the pipe that will hold the one piece integral continuous wall square pipe.

The warm one piece integral continuous wall square pipe is cooled. A top plate and bottom pan of a sheet similar to the material used to make the pipe is extruded and welded to an outside surface of the pipe enclosing the pipe. The top plate and the bottom pan are supported with at least one rib providing pressure control to the interior of the square pipe.

EXAMPLE TWO

A reduced plastic content one piece integral wound pipe is made by initiating a turning of a heated mandrel that is heated to a temperature of 40 percent less in surface temperature than the temperature of the hot plastic sheeting. The heated mandrel is being rotated a rate of speed of four revolutions per minute on a 5½ foot diameter mandrel.

Heated plastic sheeting is extruded from an extruder in a spiral manner on the heated mandrel at a variable a temperature 400 Fahrenheit without deforming or becoming soluble.

A first layer of heated polymer is wrapped while being compressed over the turning heated mandrel wherein the first layer of heated polymer disposed as overlapping wrapping on the turning mandrel or until 75 percent of the surface of the turning mandrel is covered in the layers of heated polymer forming a compressed continuous one piece sheath.

A mesh layer is disposed over the compressed continuous sheath encapsulating the cylinder on the turning mandrel while simultaneously laying a second layer of heated polymer over the turning mandrel ½ inch thickness with a width of 6 inches and compressing the layer of heated polymer into the mesh layer and the mesh layer into the first layer of heated polymer simultaneously.

The layering of the heated polymer and mesh layer is repeating until a desired wall thickness is reached, wherein a quantity of layers of heated polymer are equal to or greater than mesh layer.

The final layer of the one piece integral wound pipe can be a heated polymer layer creating a one piece integral continuous wall pipe.

After cooling the one piece integral wall pipe for 24 hours, the one piece integral continuous wall pipe is removing from the mandrel forming a one piece integral continuous wall round pipe.

A manway, a flange fitting, and the top plate and the bottom pan are added to complete the pipe The top plate and the bottom pan are supported with at least one rib or more providing pressure control to the interior of the pipe.

EXAMPLE THREE

A reduced plastic content one piece integral wound pipe is made by initiating a turning of a heated mandrel that is heated to a temperature of 40 percent less in surface temperature than the temperature of the hot plastic sheeting. The heated mandrel is being rotated a rate of speed of ten revolutions per minute on a 2 foot diameter mandrel.

Heated plastic sheeting is extruded from an extruder in a spiral manner on the heated mandrel at a variable a temperature 450 Fahrenheit without deforming or becoming soluble.

A first layer of heated polymer is wrapped while being compressed over the turning heated mandrel wherein the first band of hot plastic disposed as overlapping wrapping on the turning mandrel or until 78 percent of the surface of the turning mandrel is covered in the layers of heated polymer forming a compressed continuous one piece sheath.

A mesh layer is disposed over the compressed continuous sheath encapsulating the cylinder on the turning mandrel while simultaneously laying a second layer of heated polymer over the turning mandrel ½ inch thickness with a width of 8 inches and compressing the layer of heated polymer into the mesh layer and the mesh layer into the first layer of heated polymer simultaneously.

The layering of the heated polymer and mesh layer is repeating until a desired wall thickness is reached, wherein a quantity of layers of heated polymer are equal to or greater than the mesh layer.

The final layer of the one piece integral wound pipe can be a heated polymer layer creating a one piece integral continuous wall pipe.

After cooling the one piece integral wall pipe for 24 hours, the one piece integral continuous wall pipe is removing from the mandrel forming a one piece integral continuous wall round pipe.

A manway, a flange fitting, and the top plate and the bottom pan are added to complete the round pipe.

The top plate and the bottom pan are supported with at least one rib providing pressure control to the interior of the round pipe.

While these embodiments have been described with emphasis on the embodiments, it should be understood that within the scope of the appended claims, the embodiments might be practiced other than as specifically described herein.

Various aspects of the illustrative embodiments have been described using terms commonly employed by those skilled in the art to convey the substance of their work to others skilled in the art.

However, it will be apparent to those skilled in the art that the present invention may be practiced with only some of the described aspects. For purposes of explanation, specific numbers, materials and configurations have been set forth in order to provide a thorough understanding of the illustrative embodiments.

Various operations have been described as multiple discrete operations, in a manner that is most helpful in understanding the present invention; however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

In embodiments, portions of the cylinder can be cut into square shapes and can function as bulletproof tiles.

In embodiments, the type of mesh used within the layer operation can vary.

The above description is intended to be illustrative, and not restrictive. For example, the above-described examples (or one or more aspects thereof) may be used in combination with each other. Other embodiments can be used, such as by one of ordinary skill in the art upon reviewing the above description.

What is claimed is:

1. An accelerated method for making a reduced plastic content hybrid polymer pipe or hybrid flat sheets comprising:
   a. initiating turning of a heated mandrel heated to a temperature from 25 percent to 40 percent less in surface temperature than the temperature of a heated polymer, the heated mandrel being turned a rate of speed from 1 to 6 revolutions per minute;
   b. extruding the heated polymer from an extruder at a temperature from 400-460 Fahrenheit without deforming or becoming soluble;
   c. wrapping while compressing a first layer of the heated polymer over the turning mandrel wherein the first layer of the heated polymer is: disposed as overlapping wrapping on the turning heated mandrel from one edge of the turning heated mandrel to the opposite edge of the turning heated mandrel until from 70 percent to 80 percent of the surface of the turning heated mandrel is covered with the first layer of the heated polymer; and disposing a interstitial layer comprising mesh, glass rope, or metallic wire over the first layer of the heated polymer on the turning heated mandrel while simultaneously laying a second layer of the heated polymer over the turning heated mandrel with a width from 1 inch to 1½ feet and compressing the second layer of the heated polymer into the interstitial layer and the interstitial layer into the first layer of the heated polymer simultaneously;

d. repeating the layering of the heated polymer and the interstitial layer until a desired wall thickness is reached; wherein a quantity of layers of heated polymer are equal to or greater than the interstitial layer, creating a hybrid polymer cylinder;

e. performing one of the following to form a hybrid polymer pipe or a hybrid flat sheet:
  (i) while hot, removing the hybrid polymer cylinder from the mandrel and forming one of a warm hybrid polymer oval, square, or rectangular shaped pipe therefrom; and cooling the shaped pipe to form a shaped hybrid polymer pipe; or
  (ii) while cool, removing the hybrid polymer cylinder from the mandrel forming a round hybrid polymer pipe; or
  (iii) while warm, cutting the hybrid polymer cylinder, setting it flat and cooling it to form the hybrid flat sheet.

2. The accelerated method for making the reduced plastic content hybrid polymer pipe or hybrid flat sheets of claim 1, wherein the interstitial layer is mesh having a pore size from ¼ inch long to 1 inch long, ¼ inch wide to 1 inch wide.

3. The accelerated method for making the reduced plastic content hybrid polymer pipe or hybrid flat sheets of claim 1, wherein the interstitial layer is mesh having a thickness from 0.4 mm to 2 mm.

4. The accelerated method for making the reduced plastic content hybrid polymer pipe or hybrid flat sheets of claim 1, wherein the interstitial layer is mesh comprising at least one of: carbon steel, carbon steel coated with zinc, galvanized steel; fiberglass, carbon graphite fabric, polyamide (nylon), KEVLAR®, cotton fabric, or stainless steel.

5. The accelerated method for making the reduced plastic content hybrid polymer pipe or hybrid flat sheets of claim 1, wherein the heated polymer consists of polypropylene, polyethylene, including homopolymers and copolymers thereof, polyvinyl chloride, carbon polyvinyl chloride, polystyrene, or ultra-high molecular weight polyethylene.

6. The accelerated method for making the reduced plastic content hybrid polymer pipe or hybrid flat sheets of claim 1, wherein a roller gang applies from 90 psi to 140 psi onto at least one of the interstitial layer, the first layer of the heated polymer, or the second layer of the heated polymer.

7. The accelerated method for making the reduced plastic content hybrid polymer pipe or hybrid flat sheets of claim 1, further comprising welding a top plate and a bottom pan made from a polymer similar to the material used to make the hybrid polymer pipe to an outside surface of the hybrid polymer pipe, thereby enclosing the hybrid polymer pipe.

8. The accelerated method for making the reduced plastic content hybrid polymer pipe or hybrid flat sheets of claim 7, wherein the top plate and the bottom pan are supported with at least one rib providing pressure control to the interior of the hybrid polymer pipe.

9. The accelerated method for making the reduced plastic content hybrid polymer pipe or hybrid flat sheets of claim 8, comprising installing flange fittings into the hybrid polymer pipe to allow ingress or egress of fluids, vapors or combinations thereof into or out of the formed hybrid polymer pipe.

10. The method for making the reduced plastic content hybrid polymer pipe or hybrid flat sheets of claim 8, wherein the hybrid polymer pipe is seamless.

11. The accelerated method for making the reduced plastic content hybrid polymer pipe or hybrid flat sheets of claim 1, comprising installing a manway into the hybrid polymer pipe.

12. The method for making the reduced plastic content hybrid polymer pipe or hybrid flat sheets of claim 1, further comprising transforming the hybrid polymer cylinder to the shaped hybrid polymer pipe by putting the hybrid polymer cylinder in a jig, and inserting the jig into a rectangular shaped metal container to achieve over 95 percent volume of the metal container.

* * * * *